(12) United States Patent
Teo et al.

(10) Patent No.: US 7,293,077 B1
(45) Date of Patent: Nov. 6, 2007

(54) RECONFIGURABLE COMPUTER NETWORKS

(75) Inventors: Wee Tuck Teo, Singapore (SG); Rhandeev Singh, Singapore (SG)

(73) Assignee: Advanced Network Technology Laboratories Pte Ltd., Singapore (SG)

(*) Notice: Subject to any disclaimer, the term of this patent is extended or adjusted under 35 U.S.C. 154(b) by 693 days.

(21) Appl. No.: 10/344,784

(22) PCT Filed: Aug. 17, 2000

(86) PCT No.: PCT/SG00/00107

§ 371 (c)(1),
(2), (4) Date: Feb. 13, 2003

(87) PCT Pub. No.: WO02/15491

PCT Pub. Date: Feb. 21, 2002

(51) Int. Cl.
*G06F 15/177* (2006.01)

(52) U.S. Cl. ............ 709/221; 709/227; 709/238; 709/245; 709/246; 709/249; 370/395.53; 370/395.54

(58) Field of Classification Search .......... 709/220, 709/221, 224, 227, 238, 245, 226, 250, 246, 709/249; 370/395.53, 395.54
See application file for complete search history.

(56) References Cited

U.S. PATENT DOCUMENTS

| | | | |
|---|---|---|---|
| 5,621,726 A | | 4/1997 | Murakimi |
| 5,751,967 A | * | 5/1998 | Raab et al. ............... 709/228 |
| 5,892,912 A | * | 4/1999 | Suzuki et al. ......... 370/395.53 |

(Continued)

FOREIGN PATENT DOCUMENTS

CA 2183411 2/1997

(Continued)

OTHER PUBLICATIONS

Holdredge, M., et al., "Protocol Complications with the IP Network Address Translator," RFC 3027, pp. 1-20, Jan. 2001.

(Continued)

*Primary Examiner*—Oanh Duong
(74) *Attorney, Agent, or Firm*—TraskBritt

(57) ABSTRACT

A computer network is configured to allow addition, deletion and movement of networked objects within the network, which includes a configurable router and a plurality of networked objects, each located at a network node in the network. Configuration of the network includes the steps of:
  (a) providing a point-to-point link between the configurable router and each network node;
  (b) assigning a point-to-point link identifier to each of the point-to-point links;
  (c) obtaining for each networked object a link layer identifier;
  (d) receiving at the configurable router communications from the networked objects, the source of each communication being determinable by reference to an identifier pair consisting of a point-to-point link identifier and a link layer identifier associated with the communication;
  (e) receiving at the configurable router communications intended for individual networked objects, the destination for each communication being determinable by reference to an identifier pair consisting of a point-to-point link identifier and a link layer identifier obtained by translating a network address associated with the communication; and
  (f) detecting the addition or deletion of a networked object from the network, or the movement of a networked object from one point-to-point link to another by detecting at the configurable router discrepancies between identifier pairs associated with current communications and identifier pairs associated with previous communications, and/or by detecting non-receipt of communications.

20 Claims, 10 Drawing Sheets

U.S. PATENT DOCUMENTS

| | | | |
|---|---|---|---|
| 5,926,463 A | 7/1999 | Ahearn et al. | |
| 6,041,358 A * | 3/2000 | Huang et al. | 709/238 |
| 6,049,528 A * | 4/2000 | Hendel et al. | 370/235 |
| 6,122,268 A * | 9/2000 | Okanoue et al. | 370/338 |
| 6,130,892 A * | 10/2000 | Short et al. | 370/401 |
| 6,178,455 B1 * | 1/2001 | Schutte et al. | 709/228 |
| 6,434,627 B1 * | 8/2002 | Millet et al. | 709/245 |
| 6,442,586 B1 * | 8/2002 | Glass | 709/202 |
| 6,515,974 B1 * | 2/2003 | Inoue et al. | 370/331 |
| 6,535,493 B1 * | 3/2003 | Lee et al. | 370/329 |
| 6,556,541 B1 * | 4/2003 | Bare | 370/235 |
| 6,580,715 B1 * | 6/2003 | Bare | 370/396 |
| 6,636,894 B1 | 10/2003 | Short et al. | |
| 6,801,496 B1 * | 10/2004 | Saleh et al. | 370/221 |
| 6,834,389 B1 * | 12/2004 | Glass | 719/317 |
| 6,856,602 B1 * | 2/2005 | Westberg | 370/254 |
| 6,934,292 B1 * | 8/2005 | Ammitzboell | 370/400 |
| 2004/0027995 A1 * | 2/2004 | Miller et al. | 370/254 |

FOREIGN PATENT DOCUMENTS

| | | |
|---|---|---|
| EP | 0835009 A2 | 4/1998 |
| EP | 0835009 A3 | 4/1998 |
| EP | 0 883 266 A2 | 12/1998 |
| EP | 1 001 584 A | 5/2000 |
| JP | 2000 101589 A | 4/2000 |
| WO | WO97/48210 | 12/1997 |
| WO | 01/14988 A1 | 3/2001 |
| WO | WO 02/15491 A1 | 2/2002 |

OTHER PUBLICATIONS

Srisuresh, P., et al., "DNS Extensions to Network Address Translators (DNS-ALG)," RFC 2694, pp. 1-29, Sep. 1999.

Srisuresh, P., et al., "IP Network Address Translator (NAT) Terminology and Considerations," RFC 2663, pp. 1-30, Aug. 1999.

Srisuresh, P., et al., "Traditional IP Network Address Translator (Traditional NAT)," RFC 3022, pp. 1-16, Jan. 2001.

Vixie, P. (Ed.), et al., "Dynamic Updates in the Domain Name System (DNS Update)," RFC 2136, pp. 1-26, Apr. 1997.

Touch, J., et al., Dynamic Host Routing for Production Use of Developmental Networks, ICNP '97, Oct. 28-31, 1997, pp. 285-292., © 1997 IEEE.

Murthy, S, et al., Loop-Free Internet Routing Using Hierarchical Routing Trees, Proc. of INFOCOM '97 16th Annual Joint Conf. of IEEE Computer and Communications Societies, 1997, pp. 101-108, © 1997 IEEE.

Akyldiz, I.F., et al., A New Hierarchical Routing Protocol for Dynamic Multihop Wireless Networks, Proc. of INFOCOM '97 16th Annual Joint Conf. of IEEE Computer and Communications Societies, 1997, pp. 1422-1429, © 1997 IEEE.

Comer, D., Internetworking with TCP/IP, vol. 1, Principles, Protocols, and Architecture, 3d Ed., 1998 (approx.), pp. 245-247, 279-285, Prentice Hall, Upper Saddle River, NJ.

Tanenbaum, A.S., Computer Networks, 3d Ed., 1998 (approx.), pp. 359-368, Prentice Hall, Upper Saddle River, NJ.

Metz, C., At the Core of IP Networks: Link-State Routing Protocols, IEEE Internet Computing, Sep. Oct. 1999, pp. 72-77.

PCT International Search Report of Oct. 23, 2000.

PCT Written Opinion of Dec. 10, 2001.

Supplementary Partial European Search Report, EP 01 93 8963, dated Apr. 2, 2007, (4 pages).

* cited by examiner

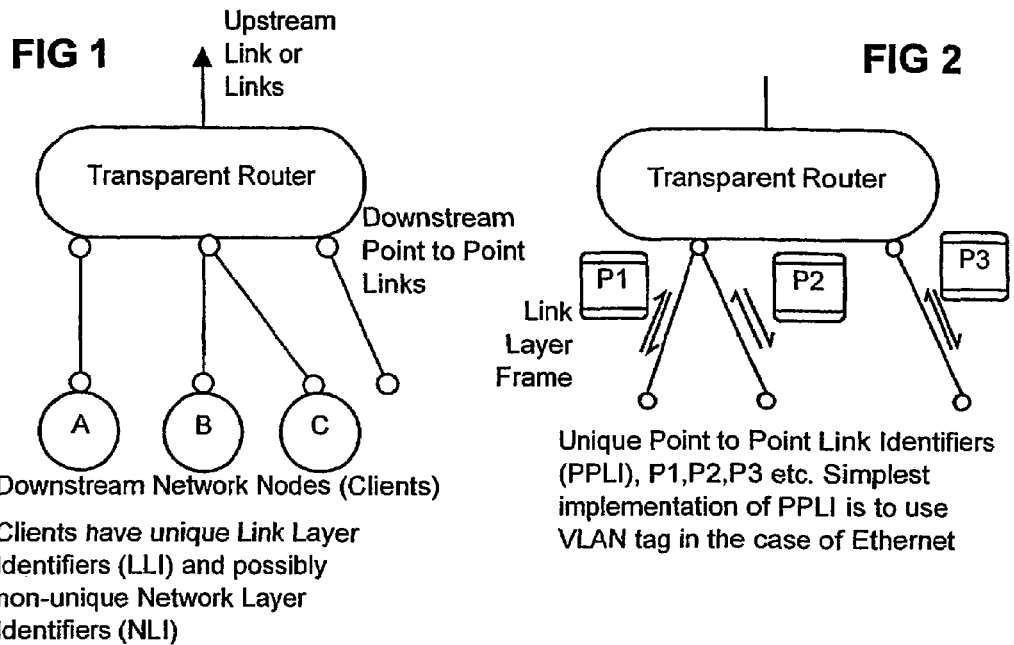
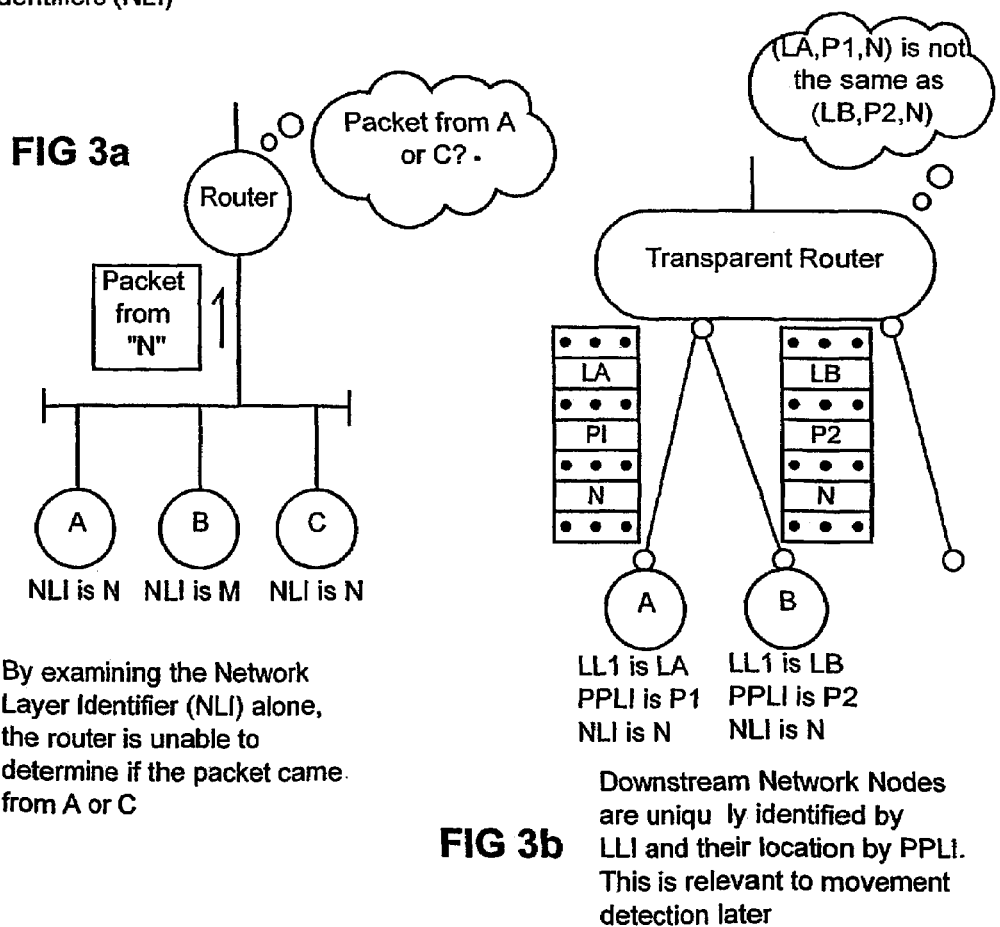

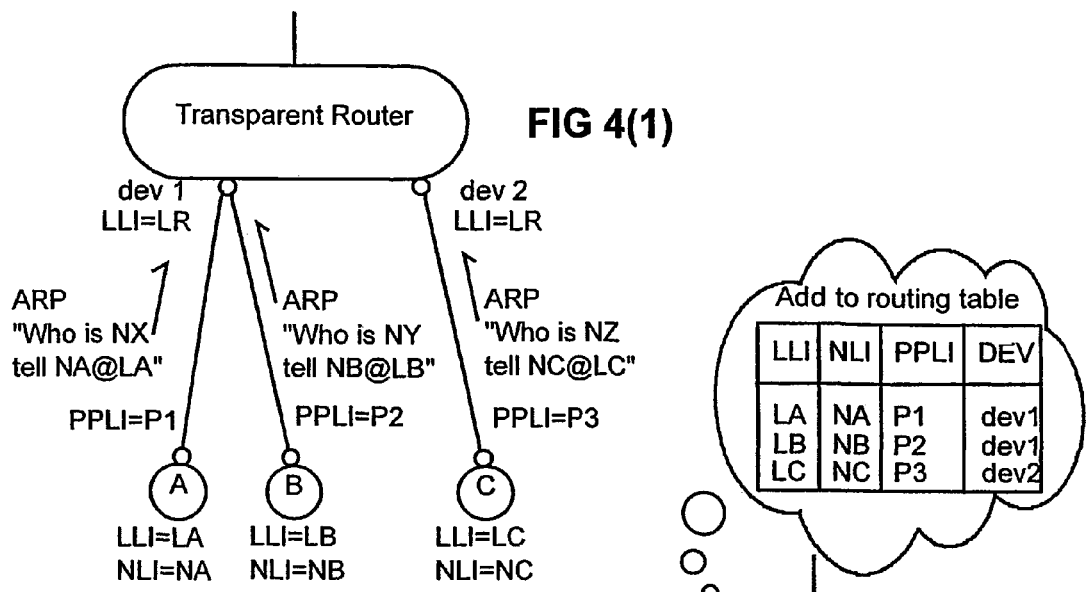
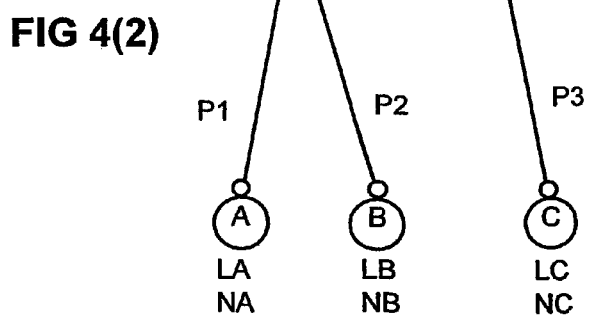
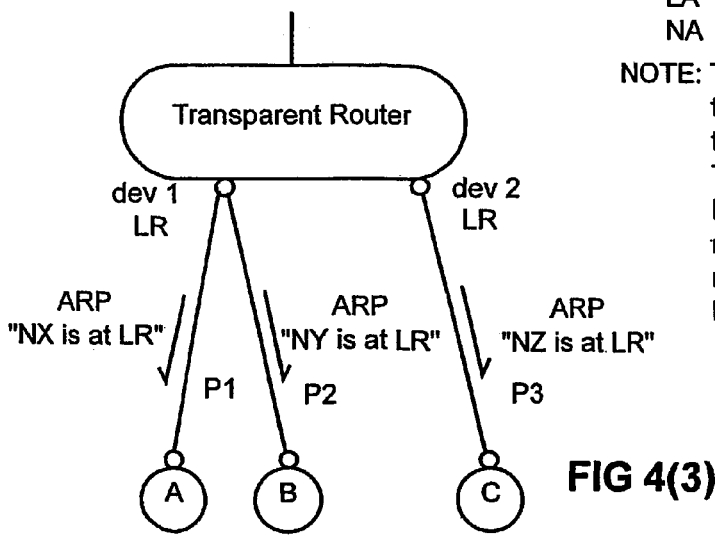
FIG 4(1)
FIG 4(2)
NOTE: The format of the routing table shown is to illustrate the general concept only. The actual format may differ. In practice, a combination of routing and switching tables may be used instead as in a Layer 3 switch.
FIG 4(3)

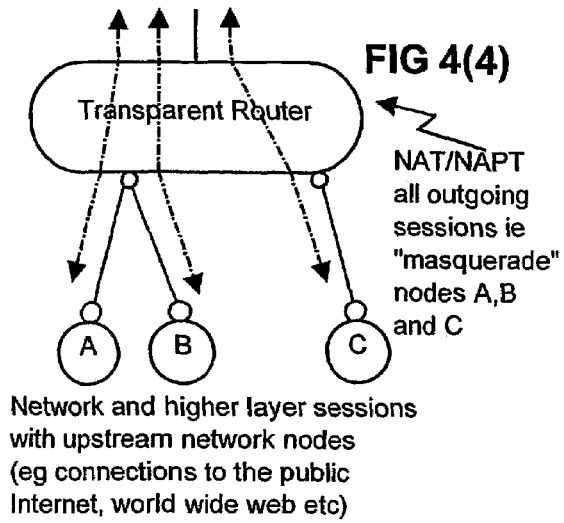

FIG 4(4)

NAT/NAPT all outgoing sessions ie "masquerade" nodes A,B and C

Network and higher layer sessions with upstream network nodes (eg connections to the public Internet, world wide web etc)

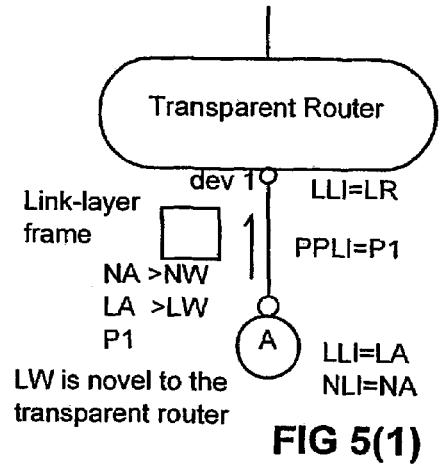

FIG 5(1)

LW is novel to the transparent router

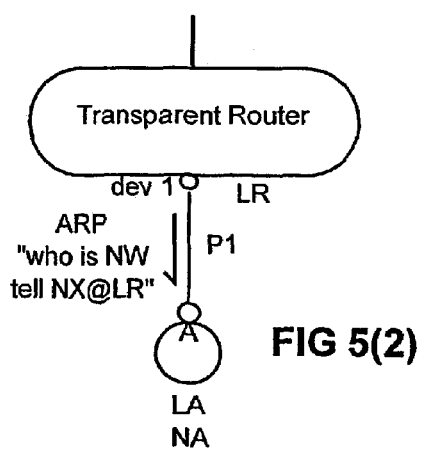

FIG 5(2)

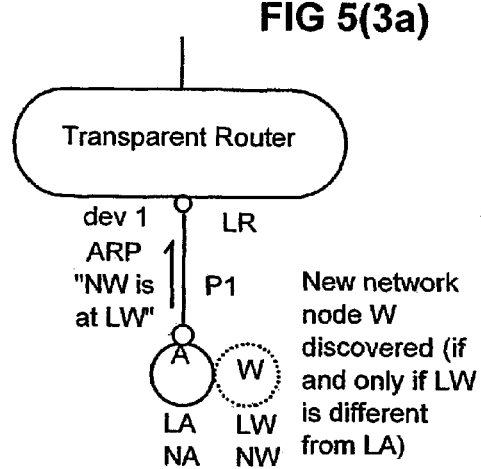

FIG 5(3a)

New network node W discovered (if and only if LW is different from LA)

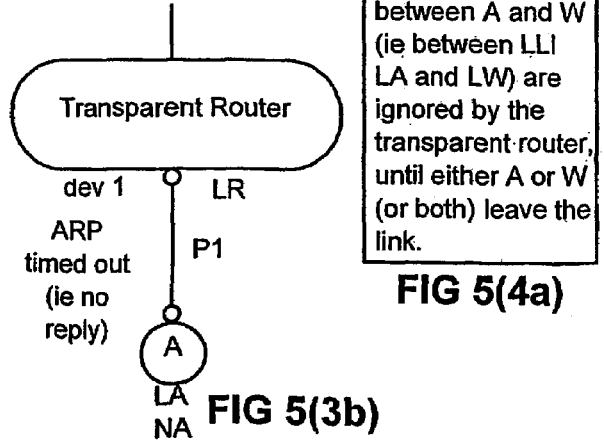

FIG 5(3b)

All link-layer frames exchanged between A and W (ie between LLI LA and LW) are ignored by the transparent router, until either A or W (or both) leave the link.

FIG 5(4a)

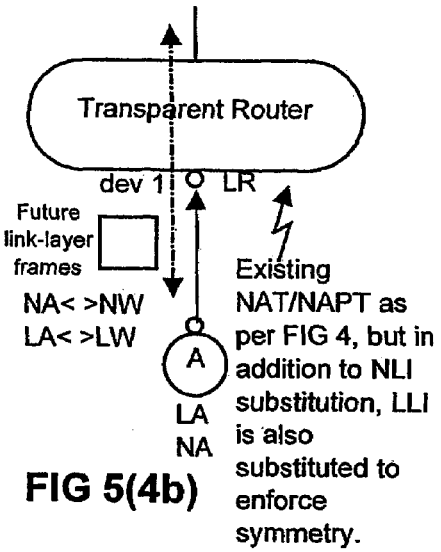

FIG 5(4b)

Existing NAT/NAPT as per FIG 4, but in addition to NLI substitution, LLI is also substituted to enforce symmetry.

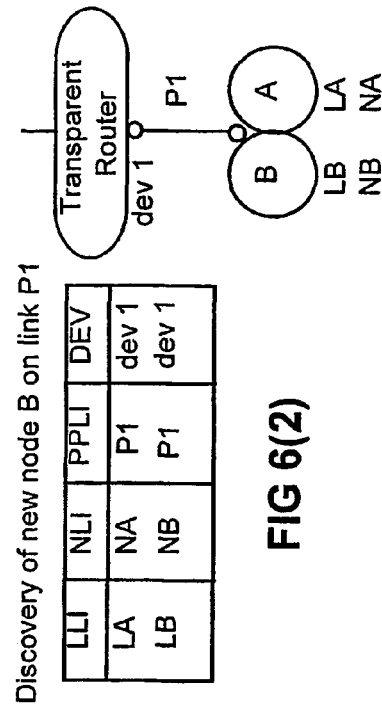

Routing Table

FIG 6(1)

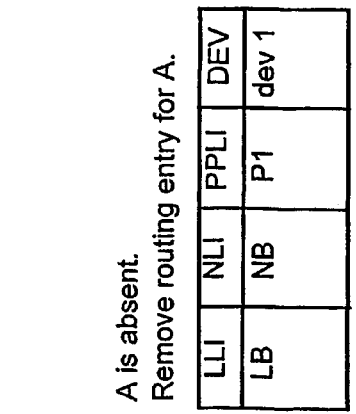

Discovery of new node B on link P1

FIG 6(2)

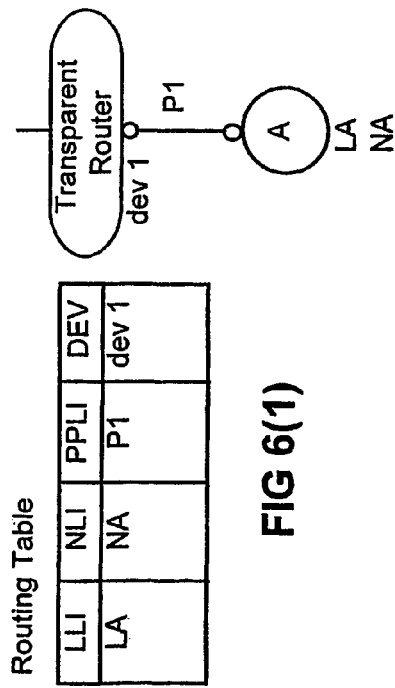

Determination of A's continued presence

ARP "who is NA tell NX@LR"

FIG 6(3)

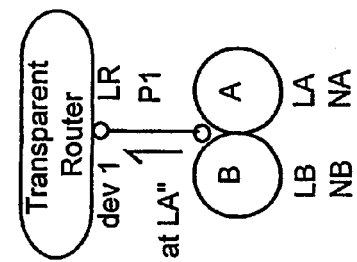

ARP "NA is at LA"

FIG 6(4a)

ARP timed out (ie no reply)

FIG 6(4b)

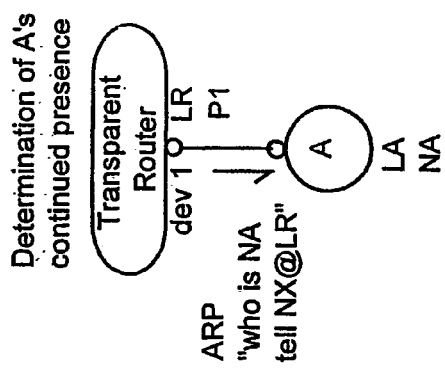

A is still present. No changes necessary. (Resource accounting records for A may be updated.)

FIG 6(5a)

A is absent. Remove routing entry for A. (Resource accounting records for A may be updated, and NAT/NAPT for A may be terminated.)

FIG 6(5b)

| LLI | NLI | PPLI | DEV |
|---|---|---|---|
| LA | NA | P1 | dev1 |
| LB | NA | P1 | dev1 |

| LLI | NLI | PPLI | DEV |
|---|---|---|---|
| LA | NA | P1 | dev1 |
| LB | NA | P2 | dev1 |

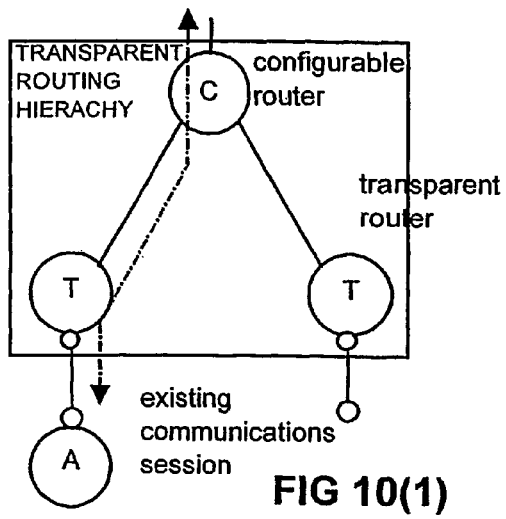
FIG 10(1)
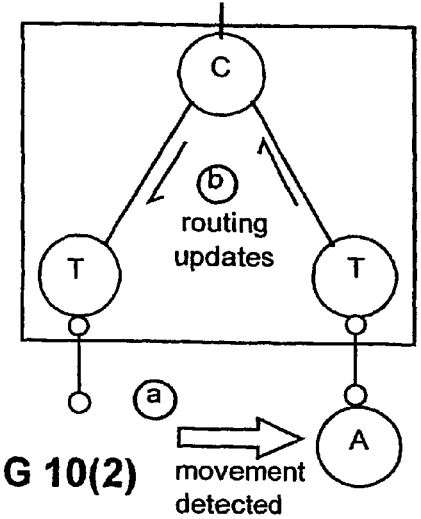
FIG 10(2)
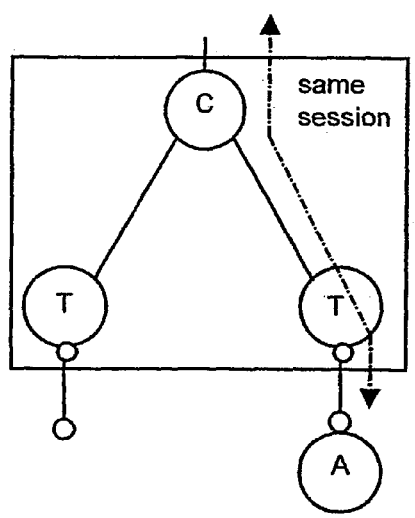
FIG 10(3)
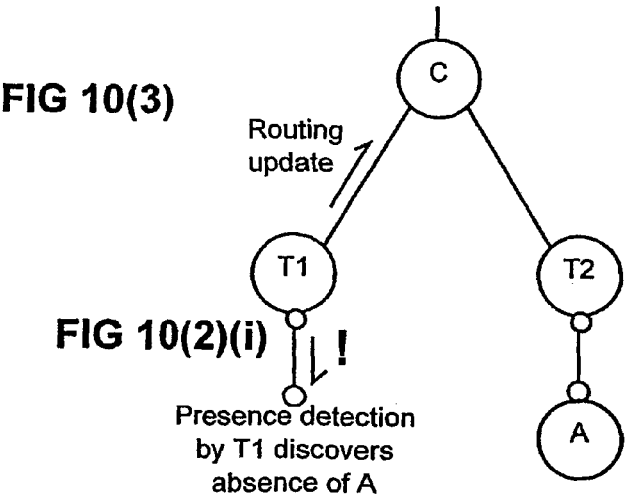
FIG 10(2)(i)
Presence detection by T1 discovers absence of A
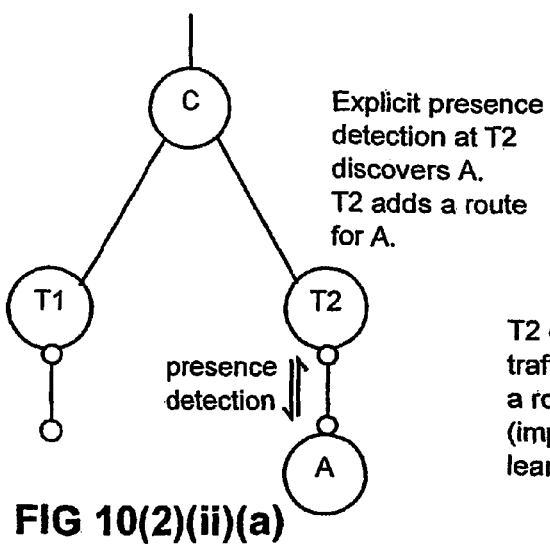
FIG 10(2)(ii)(a)
Explicit presence detection at T2 discovers A. T2 adds a route for A.
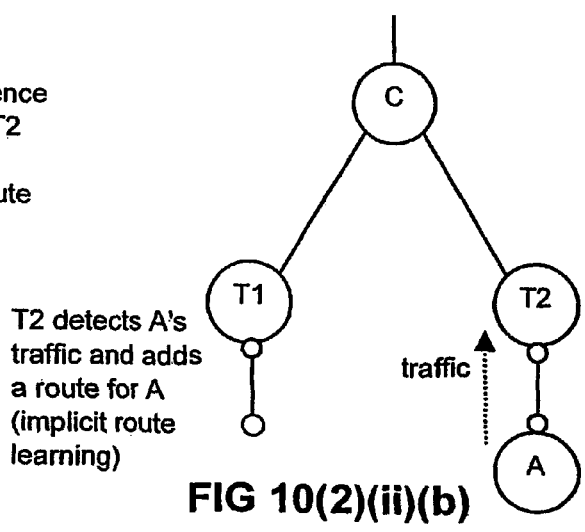
FIG 10(2)(ii)(b)
T2 detects A's traffic and adds a route for A (implicit route learning)

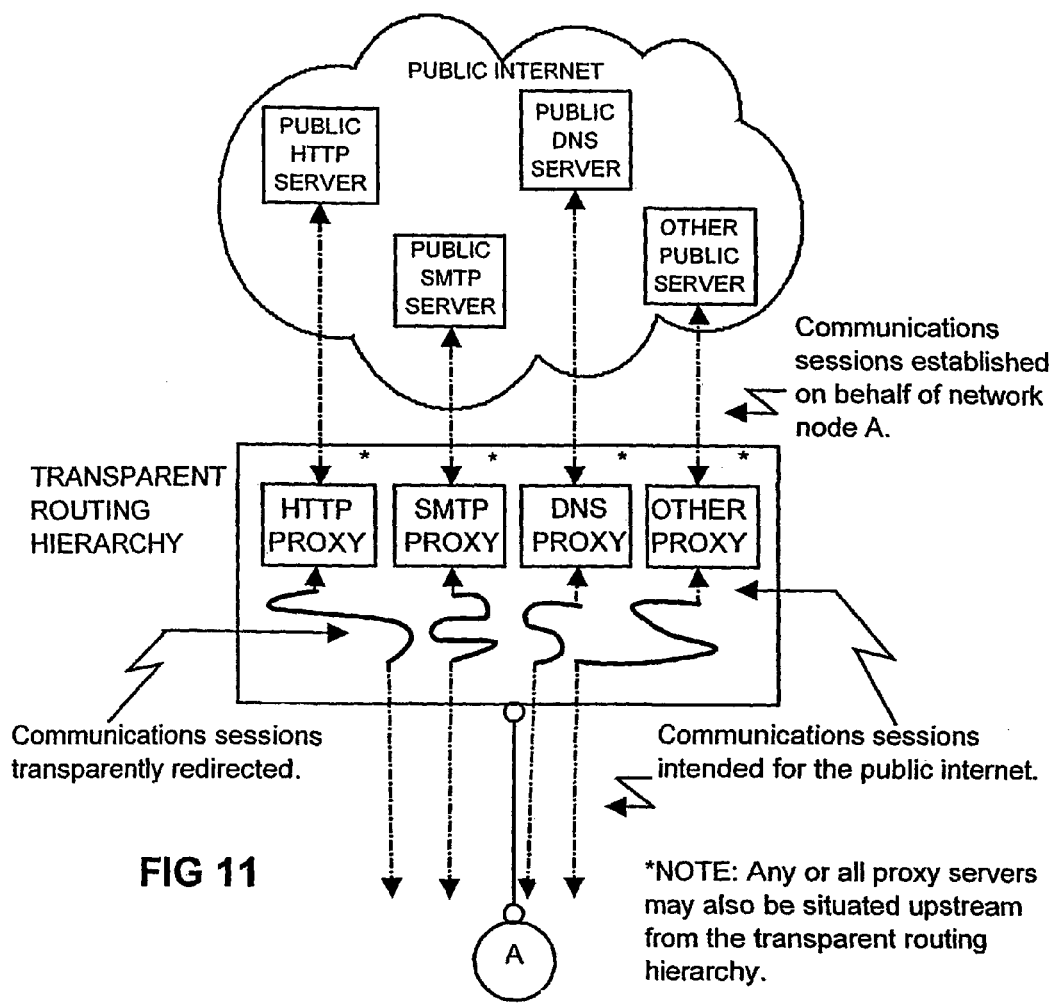
FIG 11
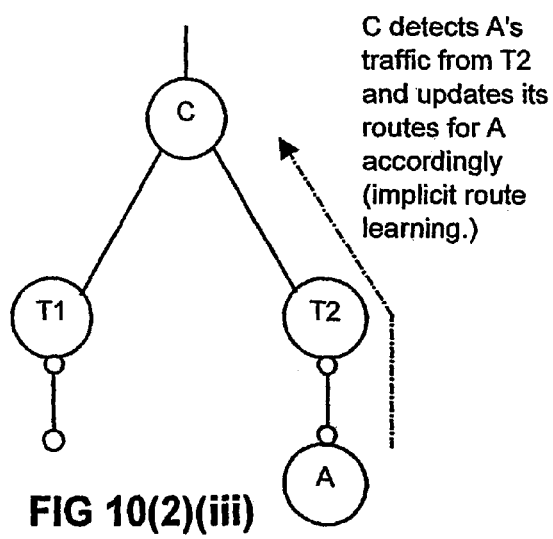
FIG 10(2)(iii)
C detects A's traffic from T2 and updates its routes for A accordingly (implicit route learning.)
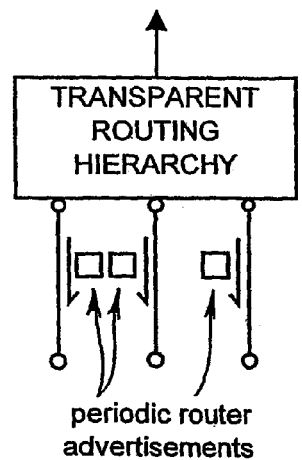
periodic router advertisements
FIG 13

RECONFIGURABLE COMPUTER NETWORKS

BACKGROUND OF THE INVENTION

1. Field of the Invention

This invention relates to reconfigurable computer networks. It relates particularly but not exclusively to methods of configuring a computer network to allow addition, deletion and movement of networked objects within the network, methods of network address translation for communications between an internal computer network and an external network, and a method of configuring a wireless computer network to allow movement of networked objects within the network

2. State of the Art

When Internet-enabled devices move from a network in one administrative domain to another, and even between networks in the same administrative domain, or between nodes within the same network, they usually need reconfiguration. As a concrete example, when personal computers running contemporary operating systems move from office to office, user intervention is often required to change the Internet configuration on these machines in order to suit disparate network environments.

This problem often manifests itself as a need to employ information technology and network professionals to perform such reconfiguration, or to assist users of the Internet-enabled devices to do so. In addition, network professionals may be needed to administer the networks themselves, resulting in a local support and maintenance burden on the owners and users of the Internet infrastructure.

Existing approaches to the problem such as Dynamic Host Configuration Protocol (DHCP) and Internet Protocol version 6 (IPv6) autoconfiguration help to alleviate the problem somewhat, but fail to solve it completely. Firstly, many of the existing approaches still require user intervention (albeit limited) in order to operate correctly. Secondly, adoption of these techniques has been slow and non-uniform to date. Thus, not all networks standardize on their use of the existing techniques, and there is a need to reconfigure Internet-enabled devices to use one technique or another (or none at all) as they are moved from one administrative domain to another.

An object of the present invention is to provide a solution to some or all of these problems.

BRIEF SUMMARY OF THE INVENTION

According to a first aspect of the invention, there is provided a method of configuring a computer network to allow addition, deletion and movement of networked objects within the network, which includes a configurable router and a plurality of networked objects, each located at a network node in the network, the method including the steps of:
- (a) providing a point-to-point link between the configurable router and each network node;
- (b) assigning a point-to-point link identifier to each of the point-to-point links;
- (c) obtaining for each networked object a link layer identifier;
- (d) receiving at the configurable router communications from the networked objects, the source of each communication being determinable by reference to an identifier pair consisting of a point-to-point link identifier and a link layer identifier associated with the communication;
- (e) receiving at the configurable router communications intended for individual networked objects, the destination for each communication being determinable by reference to an identifier pair consisting of a point-to-point link identifier and a link layer identifier obtained by translating a network address associated with the communication; and
- (f) detecting the addition or deletion of a networked object from the network, or the movement of a networked object from one point-to-point link to another by detecting at the configurable router discrepancies between identifier pairs associated with current communications and identifier pairs associated with previous communications, and/or by detecting non-receipt of communications.

As will be seen from the following description, the present invention facilitates a system in which client computers and other devices such as printers can be added into a network, taken away, or moved within a network structure without any need for reconfiguration. Further, in preferred embodiments client computers and other devices can immediately enjoy seamless access to an external network such as the Internet.

Preferably, the method includes the further step of:
- (g) automatically resolving addressing of communications in accordance with the detected changes.

The configurable router may be any suitable router or combination of routers. In some preferred arrangements such as in larger networks, the configurable router consists of a plurality of networked routers which operate together.

In preferred arrangements, the networked objects also have assigned to them network layer identifiers which may be non-unique within the network, wherein communications to networked objects within the network are routed using point-to-point link identifiers, but communications to objects external to the network are routed from the configurable router to the external objects using the network layer identifiers.

Routing of messages to and from the configurable router may be accomplished in any suitable manner. In preferred arrangements, this is accomplished by use of a routing table which includes, for each link layer identifier, a corresponding network layer identifier, a corresponding point-to-point link identifier and a corresponding network interface, wherein the network interface indicates the location associated with the router through which communications are made to the networked object associated with each link layer identifier.

In some private network configurations, a client computer or other device depends for proper operation on one or more servers whose names are known only within the private network, so that moving the client computer or other device to a new network location results in an error because the named server cannot be found. As a preferred feature the method may include the ability to circumvent such difficulties by including the further steps of:
- (a) intercepting Domain Name System requests from the networked objects;
- (b) analyzing such requests; and
- (c) where appropriate, creating information indicative of successful Domain Name System requests and forwarding that information to the requesting networked objects.

A "configurable router" preferably has the following characteristics:
- (a) capable of conventional network layer routing;
- (b) capable of routing based on point-to-point link identifier alone (i.e. operating like a switch, except that even link layer identifiers are ignored, and only point-to-point link identifiers are used for forwarding decisions;
- (c) may be capable of network address translation;
- (d) may be capable of recovering the point-to-point link identifier of associated internal networked objects during network address translation.

According to a second aspect of the present invention, there is provided a method of network address translation for communications between an internal computer network and an external network, the method allowing addition, deletion and movement of internal network objects within the internal network which has a configurable router, including the following steps:
- (a) providing a logical point-to-point link between the configurable router and each internal network object;
- (b) assigning a point-to-point link identifier to each of the point-to-point links;
- (c) obtaining for each internal network object a link layer identifier;
- (d) receiving at the configurable router communications from the internal network objects addressed to objects in the external network, the address of each external network object being determinable by means of a network layer identifier associated with the external network object, the internal network source of each communication being determinable by reference to an identifier pair consisting of a point-to-point link identifier and a link layer identifier associated with the communication;
- (e) forwarding those communications to the external network objects;
- (f) receiving at the configurable router communications from external network objects intended for internal networked objects;
- (g) for each such communication determining an identifier pair consisting of a point-to-point link identifier and a link layer identifier obtained by translating a network address associated with the communication, and forwarding the communication to the destination so determined; and
- (h) detecting the addition or deletion of an internal network object from the internal network, or the movement of an internal network object from one point-to-point link to another by detecting at the configurable router discrepancies between identifier pairs associated with current communications and identifier pairs associated with previous communications, and/or by detecting non-receipt of communications.

When the router sends communications to objects on the external network (such as the Internet), it may provide a network layer identifier in any suitable manner. In one suitable arrangement, a network layer identifier is assigned to communications forwarded from the configurable router to external network objects, the assigned network layer identifier being the network layer identifier or one of a group of network layer identifiers associated with the router.

As a preferred enhancement, the method may include support for transparent routing between internal network objects and external network objects of various different types of services. In this case, the method includes the further step of providing transparent routing services for one or more of:

- (a) Domain Name System services;
- (b) electronic mail services;
- (c) Hypertext Transfer Protocol services;
- (d) audio services;
- (e) video services
- (f) telephone services.

According to a further aspect of the invention, there is provided a method of configuring a computer network to allow addition, deletion and movement of networked objects within the network, which includes two or more transparent routers and a plurality of networked objects, each located at a network node in the network and having a network layer identifier, the method including the steps of:
- (a) providing a point-to-point link between one of the transparent routers and each network node;
- (b) assigning a point-to-point link identifier to each of the point-to-point links;
- (c) obtaining for each networked object a link layer identifier;
- (d) receiving at one of the transparent routers communications from the networked objects, the source of each communication being determinable by reference to an identifier pair consisting of a point-to-point link identifier and a link layer identifier associated with the communication;
- (e) receiving at one of the transparent routers communications intended for individual networked objects, the destination for each communication being determinable by reference to an identifier pair consisting of a point-to-point link identifier and a link layer identifier obtained by translating a network address associated with the communication; and
- (f) detecting the addition or deletion of a networked object from the network, or the movement of a networked object from one point-to-point link to another by detecting at one of the transparent routers discrepancies between identifier pairs associated with current communications and identifier pairs associated with previous communications, and/or by detecting non-receipt of communications;
- wherein the transparent routers are connected to form a routing hierarchy, and each transparent router is allocated a network layer identifier from the local loopback segment of network layer identifiers, thereby avoiding collisions with any valid network layer identifier currently in use by a network node.

A "transparent router" preferably has the following characteristics:
- (a) understands point-to-point link identifiers for both incoming and outgoing communications;
- (b) capable of making routing decisions based on point-to-point link identifiers and/or link layer identifiers;
- (c) performs modified address resolution protocol;
- (d) may be capable of network address translation.

It will be appreciated that the present invention is of particular use in the field of mobile computing. According to yet another aspect of the invention, there is provided a method of configuring a wireless computer network to allow movement of networked objects within the network, which includes a transparent router and a plurality of networked objects, each located at a network node in the network, the method including the steps of:
- (a) providing a point-to-point link between the transparent router and each network node;
- (b) assigning a point-to-point link identifier to each of the point-to-point links;

(c) obtaining for each networked object a link layer identifier;

(d) receiving at the transparent router communications from the networked objects, the source of each communication being determinable by reference to an identifier pair consisting of a point-to-point link identifier and a link layer identifier associated with the communication;

(e) receiving at the transparent router communications intended for individual networked objects, the destination for each communication being determinable by reference to an identifier pair consisting of a point-to-point link identifier and a link layer identifier obtained by translating a network address associated with the communication; and (f) detecting the addition or deletion of a networked object from the network, or the movement of a networked object from one point-to-point link to another by detecting at the transparent router discrepancies between identifier pairs associated with current communications and identifier pairs associated with previous communications, and/or by detecting non-receipt of communications.

As indicated previously, in preferred arrangements the transparent router consists of a hierarchy of routers wherein each router is allocated a network layer identifier from the local loopback segment of network layer identifiers, thereby avoiding collisions with any valid network layer identifier currently in use by a network node; wherein further each router which connects directly to one of the network objects is a transparent router.

BRIEF DESCRIPTION OF THE DRAWINGS

The invention will hereafter be described in greater detail by reference to the attached drawings which show an example form of the invention. It is to be understood that the particularity of those drawings does not supersede the generality of the preceding description of the invention.

FIG. 1 is a schematic diagram illustrating an aspect of a network according to the present invention.

FIG. 2 is a schematic diagram illustrating another aspect of a network according to the present invention.

FIGS. 3a and 3b are schematic diagrams illustrating a network address collision problem and solution according to the invention.

FIGS. 4-1 to 4-4 are schematic diagrams illustrating communications between networked objects and a router in accordance with the invention.

FIGS. 5-1 to 5-4b are schematic diagrams illustrating adding and removing networked objects to links in accordance with the invention.

FIGS. 6-1 to 6-5b are further schematic diagrams illustrating adding and removing networked objects to links.

FIGS. 9-1 to 9-4 illustrate seamless movement of a networked object between different locations within a network.

FIGS. 10-1 to 10-3 further illustrate movement of a networked object within a network.

FIG. 11 is a schematic illustration of various Internet services operating through a transparent routing hierarchy according to an embodiment of the invention.

FIG. 13 is a schematic diagram illustrating the use of periodic router advertisements in accordance with a preferred feature.

DETAILED DESCRIPTION OF THE INVENTION

The Link and Network Layers

Figures 7, 8:
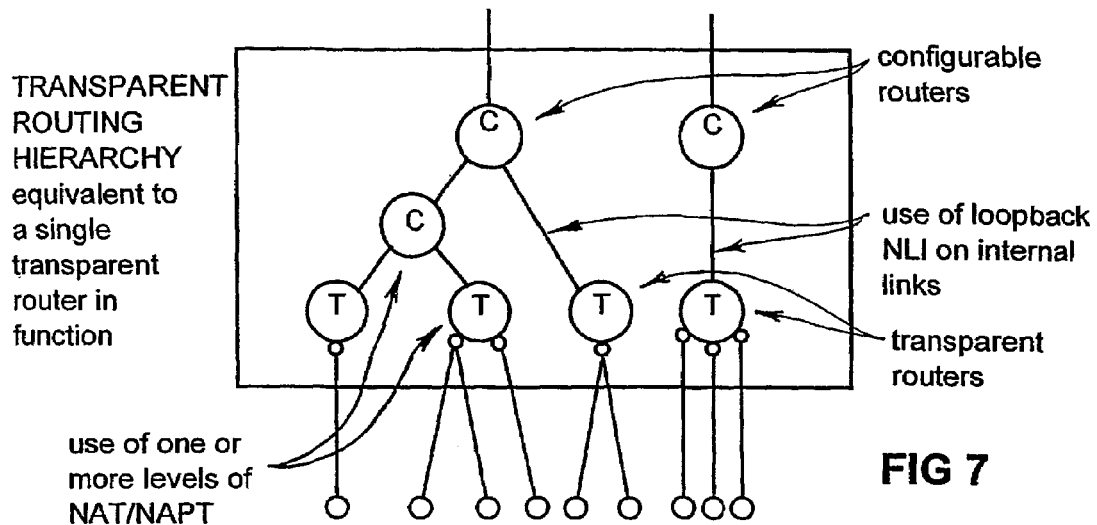
FIG. 7 is a schematic illustration of a transparent routing hierarchy in accordance with an embodiment of the invention.
FIG. 8 illustrates some valid routing tables for use in accordance with the invention.

FIGS. 1 and 2 illustrate the use of point-to-point links in accordance with the invention. Each is a one-to-one data communications network link from the router to a single network node. Each point-to-point link has a unique identifier associated with it (a Point-to-Point Link Identifier, or PPLI). This may or may not be manifest at the link layer. A prototype implementation of this design employs the VLAN (Virtual Local Area Network) identifier for this purpose, although this is only a particular manifestation of the general design.

The system illustrated in FIG. 1 shows a router and three networked objects or client computers, labelled A, B and C. Each of the clients is allocated a unique link layer identifier (LLI), and each point-to-point link is allocated a unique Point-to-Point Link Identifier (PPLI), as shown in FIG. 2. Further, each point-to-point link originates from a particular network interface (DEV) on the router. In the arrangement of FIG. 1, the point-to-point link leading to A originates from the first network interface, and the point-to-point links leading to B and C both originate from the second network interface.

The point-to-point design solves the address collision problem at the network layer, and to prevent interference between nodes connected to the transparent router (except for the uplink). This is illustrated in FIGS. 3a and 3b. FIG. 3a illustrates a situation in which both A and C have a Network Layer Identifier (NLI) of "N." In a normal network, this would create a collision, with the router unable to determine whether to route messages to A or C. FIG. 3b shows the resolution to this problem. Although both A and B in this case have an NLI of "N," A has a LLI of "LA" and a PPLI of "P1." B has a LLI of "LB" and a PPLI of "P2." The router can therefore distinguish between the two.

The Virtual Local Area Network (VLAN) identifier is already used in Cisco's and 3COM's higher end VLAN switches. Using VLAN tags as PPLI is one convenient implementation of the transparent router point-to-point design of the present invention, but it is by no means the only solution. The use of PPLI for avoiding address collision, and especially, for movement detection, represents a significant departure from the ways in which VLAN tags have been used in the past.

All address resolution protocol (ARP) requests received from the downstream point-to-point links are replied to by the transparent router. The ARP replies issued downstream from the transparent router contain the same invariant link layer identifier (LLI) in the source link layer address field of the ARP reply, regardless of the network interface through which the ARP reply is transmitted. ARP replies are transmitted through the same network interface (DEV) from which the corresponding ARP request was received, and using the same point-to-point link identifier (PPLI) as the corresponding ARP request. This is illustrated in FIG. 4.

The transparent router routes any network traffic destined for the above-mentioned invariant LLI.

The transparent router typically operates by use of a routing table. The routing table is dynamically updated. Each routing entry has associated with it the link layer identifier (LLI) of the network node for which the entry was inserted. The link layer identifier in this case may or may not include virtual local area network (VLAN) identifier in addition to the network node's LLI. Alternatively, the necessary information may be separated into a routing table and a switching table, as is commonly done in existing layer three switches.

The network layer identifier (NLI), link layer identifier (LLI) and point-to-point link identifier (PPLI) associated with a given routing entry causes the router to expect all traffic from that same LLI to originate from the same client, irrespective of whether that client is using the same NLI throughout. In addition, the PPLI signifies the client's physical location. This treatment of LLI and PPLI is useful for accounting as well as movement detection purposes.

Whenever a link layer frame contains the same source LLI, but the network layer protocol data unit (PDU) in that frame contains a different source NLI, the routing entry corresponding to the former NLI of the network node in question is removed, and a routing entry for the new NLI corresponding to the same LLI is inserted. In other words, the clients are uniquely identified by their LLI, not by their NLI, and the network layer routing is dynamically adjusted to reflect this based on all incoming datagrams. The PPLI, on the other hand, are used to track the physical location of the downstream network nodes, in the event that they move from one point-to-point link to another.

These associations are made based on all incoming link layer frames, which are examined for any changes that would be necessary to the corresponding routing table entry in order to continue routing future datagrams to and from the network node in question, catering for any node migration from one transparent router network interface to another if necessary.

New routing entries are created whenever a hitherto unknown LLI is observed in any incoming link layer frame, such that traffic destined for the newly observed network nodes are routed to the correct point-to-point link via the appropriate interface and PPLI on the transparent router.

In addition, whenever a datagram destined for an unknown LLI is observed, the transparent router will transmit an ARP request for the NLI in question. If no reply is forthcoming within a specified timeout, then the router will treat the abovementioned novel destination LLI as its own, and accordingly perform network layer routing of the network PDU contained within the abovementioned link layer frame.

This is illustrated in FIG. 5. In FIGS. 5-1, the router is shown as receiving a link-layer frame with PPLI=1, NLI=NW and LLI=LW. LW is unknown to the router, so it transmits an ARP request for NLI=NW, as shown in FIGS. 5-2. If, as shown in FIGS. 5-3a, a response is received that "NW is at LW," the details of the new node are added into the routing table. If, as shown in FIGS. 5-3b, no reply is received and the ARP times out, no change is made.

The transparent router also routes traffic destined for any LLI for which the router is unable to solicit an ARP reply within a specified timeout.

When inserting a routing entry for a particular VLAN identifier that already has existing routing entries associated with it, the transparent router transmits ARP requests on all its network interfaces to verify that the network node corresponding to the existing routing entry is still accessible from the transparent router. In the event that no corresponding ARP reply is received within a specified timeout, such a node is deemed to have left the network, and necessary cleanup is performed.

This is illustrated in FIG. 6. FIGS. 6-1 shows the existing arrangement and routing table. FIGS. 6-2 shows the discovery of a new node B on link P1, with a resulting change to the routing table. FIGS. 6-3 shows an enquiry made to determine whether A is still present on link P1. FIGS. 6-4a shows the response if A is still present, in which case no further changes are required. FIGS. 6-4b and 6-5b show the action required if the ARP times out, with A being removed from the routing table.

However, in the event that an ARP reply is received from the abovementioned network node, but on a different interface, then updates to the routing table are performed to reflect the network node's new location. The new link layer frame is handled as above, as when a new link layer identifier is observed.

Multiple routers can use the same invariant LLI on the interfaces that are connected to network nodes that are not also transparent routers. In other words, there can be a hierarchy of multiple transparent routers that coexist, such that, from the other network nodes' point of view, the hierarchy appears to have a single network interface (and may even appear to be a single machine), such that each real interface that is using the invariant LLI is one end of a distinct point-to-point link with a network node that is not a transparent router. This is illustrated in FIG. 7.

Typically, in a routing hierarchy, configurable routers occupy all but the leaf nodes of the hierarchy. The leaf nodes consist of transparent routers which are each one network hop away from internal networked objects (they could be more than one link layer hop away, though; e.g. if switches and hubs are used).

The root node (or nodes) of a transparent routing hierarchy are configurable routers that should be network address translation capable, and able to associate NAT sessions with the PPLI of internal network nodes (but not necessarily the LLI of such nodes—unless, of course, the root node also happens to be a leaf node, and therefore is itself also a transparent router, in which case it must associate NAT sessions with the (PPLI, LLI)-pair of internal networked objects). Internal nodes in the transparent routing hierarchy need not perform NAT; however, they should be able to route communications according to PPLI alone.

There are two ways to implement the transparent routing hierarchy, and therefore the dynamic network, according to the present invention. The first way is easier to deploy quickly without providing mobility support for the internal networked objects. It is more difficult to provide mobility support later on with this method, however. In the following discussion this is called Hierarchy Method A. The second way provides seamless mobility support for clients easily, but is slightly more difficult to implement at the outset. In the following discussion this is called Hierarchy Method B.

Hierarchy Method A

The root of the hierarchy is a NAT-capable configurable router that performs conventional NAT (or NAPT). The routers internal to the hierarchy are simply conventional routers which neither need perform NAT nor need be PPLI-aware. The routers at the leaf nodes of the hierarchy are transparent routers that perform PPLI-aware NAT. They also provide modified ARP and related mechanisms.

Because each transparent router is also a NAT box, ongoing communications sessions between internal and external networked objects have state information stored in the relevant transparent router. If an internal networked object migrates from one such transparent router to another, then either the NAT state information can be migrated from one NAT box to another, which is possible but rather convoluted, implementation-wise; or the NAT state information could simply be ignored, allowing the communications sessions to timeout.

Whichever choice is made, the configurable routers upstream from the transparent routers still have to get their routing tables updated, so that they will be able to relay communications downstream to the correct transparent router (since the client has moved now). Their routes are updated dynamically according to FIG. 10*b*.

Hierarchy Method B

This is essentially Hierarchy Method A, but with the following differences:

(1) Transparent routers at the leaf nodes of the routing hierarchy do not perform NAT. They simply route traffic upstream and downstream based on the point-to-point link identifier of the communications. Such routing decisions may also require knowledge of the incoming network devices from which the communication was received by the router, depending on how the PPLI are assigned to links within the routing hierarchy.

(2) Configurable routers internal to the transparent routing hierarchy must now be able to handle PPLI for traffic that they route. Such traffic is routed according to PPLI (and possible incoming network device) of the communications, i.e. the way the transparent routers do routing.

(3) The root router in the hierarchy is still a configurable router and it still performs NAT, but this time it performs PPLI-aware NAT.

Seamless mobility is provided by the transparent routing hierarchy according to FIGS. 10*a* and 10*b*, and NAT state information need no longer be migrated from one router to another as internal network nodes migrate from a point-to-point link at one transparent router to a point-to-point link on another.

The route update mechanism as in Method A now provides for this level of mobility. Note, however, that the root router (i.e. the PPLI-aware NAT box) needs to be able to update its NAT state information (namely, the PPLI field of the NAT associations) if internal networked objects move substantially. Note also that such updates do not change the behaviour of the NAT itself, but only the subsequent forwarding of communications.

Multiple routing entries can coexist in a transparent router's routing table such that each has a unique LLI (and/or PPLI) associated with it, but all share the same destination NLI. Some examples of valid routing tables are illustrated in FIG. 8.

Network address translation (NAT) and variants thereof, such as network address and port translation (NAPT), can be performed at a higher level within the routing hierarchy (i.e. closer to the root of a tree of routers), not necessarily by the transparent routers themselves.

Network address translation (NAT) and variants thereof such as Network Address and Port Translation (NAPT) are known. A dynamic NAPT facility is provided in the GNU/Linux operating system, in which it is commonly called "IP Masquerading." However, the use of NAT/NAPT together with the ARP technique above to perform routing for clients regardless of the NLI (i.e. "zero-configuration" of clients), and furthermore, to support seamless network mobility of clients, provides a significant advance over known techniques. The use of NAT/NAPT alone is unable to provide zero-configuration, since conventionally, clients must specifically use the NAT unit as their default gateway.

Figure 9:
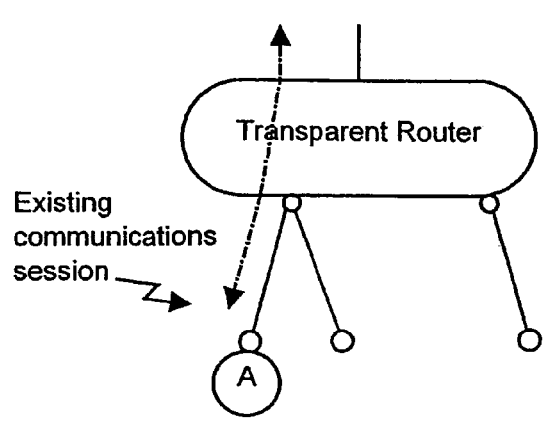
Figure 9:
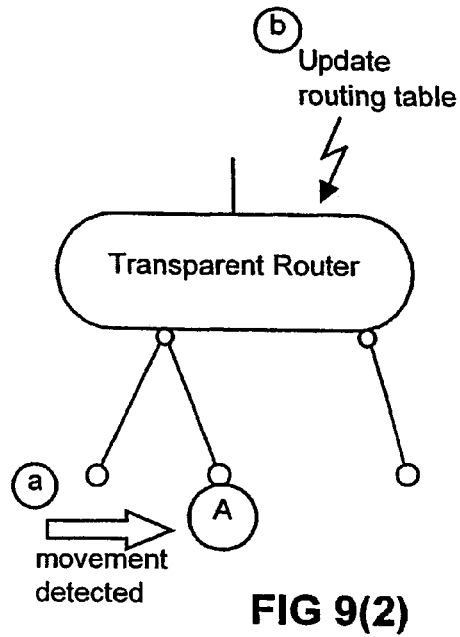
Figure 9:
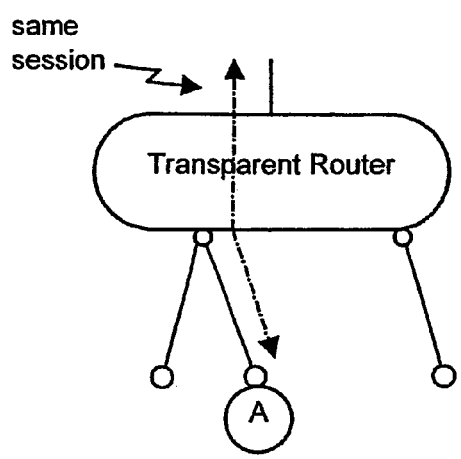
Figure 9:
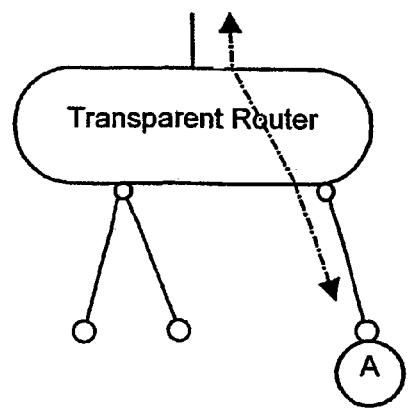

FIGS. 9 and 10 illustrate movement of a networked object such as a client computer from one position to another across a network structure. FIGS. 9-1 shows that a message is sent from A to an external address via a first link to the transparent router. FIGS. 9-2 shows movement of A from the first link to a second link. FIG. 3 shows a reply being received during the same session, and correctly routed to A via the new link. FIGS. 9-4 shows A having moved to yet another link, with the routing table having been updated accordingly.

FIGS. 10-1 shows a transparent routing hierarchy, with A sending a communication to an external address via a first router in the transparent routing hierarchy. FIGS. 10-2 shows movement of A from the first router to a second router, with the routing table being updated accordingly. FIGS. 10-3 shows a response from the external address during the same session being correctly routed to A via the second router.

All the above applies to the point-to-point links on the downstream side of the transparent router. Upstream connections require no special handling apart from the usual TCP/IP standards, with the exception that a subset of the local loopback address space may be used to route traffic to and from the upstream connections.

The zero configuration feature of the present invention generally requires three mechanisms operating concurrently in order to work. Taken in isolation, these mechanisms are insufficient to provide the feature.

(a) Expected Network Behavior

The network needs to meet the expected network behavior of the network objects. Minimally, this requires the transparent router to respond to all ARP requests sent by the network objects. The end result is all outgoing communication from the network objects will be targeted at the transparent router.

If the transparent router does not respond to the ARP requests from the network objects, the latter will "hang" waiting to resolve the destination link layer address.

This idea is further expanded such that any local resources required by the network objects should be provided by the dynamic network e.g. default gateway router, DNS server, Primary Domain Controller. The purpose is that any resource requests sent by the network object will be fulfilled by the dynamic network in order to mimic the behaviour expected by the network object as if it were in its original home network.

(b) Learned Forwarding Paths

When the dynamic network receives communication initiated by the network objects, it must learn and record the forwarding path taken from the start of the network node to its final exit out of the dynamic network into the Internet. This is to allow the dynamic network to be able to forward the reply from the Internet in the reverse of the recorded path to the original network object.

The router learns the downstream network interface through which a network object is situated implicitly from the PPLI of the incoming upstream communication from the network objects. When the router receives communication destined for the network objects, it uses this implicitly learnt downstream path to forward the communication.

Note the reverse path taken for the reply might not the same as the original forward path recorded for the request initiated by the network objects. This is because we cater for movement of network objects across network nodes. So at least one copy of the reply must be sent back to the latest recorded path of the network node. Duplicate copies of the reply might be sent back to the previous recorded path of the network objects as well as adjacent network nodes to which the network objects might have roamed during the interval of initiating the communication and receiving the reply.

(c) Network Address Translation

All outgoing communications initiated by the network objects must be processed by network address translation (NAT) before being forwarded to the public Internet. This is because the network layer identification of the network objects (the IP address) is topologically wrong. There is no way for the final recipients to reply to the network objects. Therefore, NAT must be done to allow the dynamic network to assign a topologically correct IP address to the outgoing traffic. The recipient will send any reply back to this topologically correct IP address, allowing the dynamic network to receive the reply.

Transparent Routing Hierarchy

The NLI of downstream transparent router interfaces (and some upstream interfaces as well) are preferably allocated from the local loopback segment. This is to prevent collisions with any valid NLI which are in use by network nodes that are not transparent routers.

Two or more transparent routers may be connected to form a routing hierarchy, such that all routers in the hierarchy may associate addresses from the abovementioned range with their network interfaces. Addresses used in this way are unique within the transparent routing hierarchy, so that existing network protocol stacks may be used on the transparent routers with minimal modification, and without breaking existing network protocols.

Normal routing is thus used within the transparent routing hierarchy, and all the internal links (that is, links between routers in the transparent router hierarchy) are analogous to loopback links in the case of a single transparent router. The entire hierarchy is thus equivalent to a single transparent router performing all internal network transactions through its local loopback interface. This arrangement allows distribution of workload, provision of high availability, functional partitioning, network management, etc instead of relying on a single transparent router. This is illustrated in FIG. 7.

Traffic that is routed through the transparent routing hierarchy is subject to one or more network address (and possibly port) translations. This allows downstream nodes to use network layer identifiers which would otherwise be invalid in their current network location.

The path to and from a given internal network object may be through multiple routers. This path consists of multiple links. Each link along the same path need not be assigned the same PPLI.

Wireless Mobility Support

The above propagation of routes allows the migration of downstream network nodes from one point-to-point link to another without causing their existing network communications sessions from terminating or halting. This has important applications in wireless networking—the user may move from one wireless network to another without having to change his network layer identifier, and therefore, without causing lengthy or permanent delays or errors in his running network applications. FIGS. 9 and 10, as described above, illustrate this.

Current network layer mobility solutions tend to approach this problem in a different way. The most notable of these is Mobile IP (MIP) (RFC2002, RFC2005, RFC2344), where additional functionality must be built into clients as well as their correspondent nodes in the public Internet (although this is not compulsory in the latter case) in order to support the protocol. The transparent routing hierarchy solution provided by the present invention requires no modification of client nodes nor their correspondent nodes in other networks, e.g. the public Internet.

In addition, MIP makes no effort to depend on link layer identifiers of any sort in order to solve the address collision problem, and instead relies on an elaborate system of network layer tunnels to support address collision and client mobility. Finally, where the transparent router solution performs routing updates within the transparent routing hierarchy itself in order to support client mobility, MIP attempts to propagate routing updates to correspondent nodes (or to foreign agents) instead, and additional network layer tunnels have to be established as the client moves from one network location to another.

While MIP relies on a combination of additional network intelligence (in the form of home and foreign agents) and client node intelligence, the transparent router approach of the present invention achieves all additional functionality by enhancing the network itself (i.e. routers and link layer technology e.g. switching). Movement detection and routes propagation functionality is built into the transparent routers themselves, and a point-to-point setup with unique PPLI per transparent router is used to facilitate movement detection.

Finally, MIP is intended for general use irrespective of network architecture, whereas the transparent router solution enforces a point-to-point downstream architecture. MIP is thus suitable for generic deployment in the Internet while the transparent routing hierarchy is not, but only useful in the specific scenario where downstream point-to-point links are appropriate.

This does not mean that the downstream point-to-point links need always be physically separate along their entire length for the purposes of the present invention. The use of unique PPLI allows traffic from multiple point-to-point links to be aggregated along a single upstream link such that upstream traffic belonging to distinct downstream links is still distinguishable.

Another attempted solution to the mobility problem is the IP Relocation using Network Address Translation (RAT) protocol. The RAT protocol attempts to provide generic network layer mobility on the public Internet without modification of client nodes. However, no attempt is made to propagate routing information between network nodes, and no reliance is placed on the link layer information nor architecture. In addition, RAT provides for only limited network layer mobility. No attempt is made to preserve ongoing transport and application layer sessions between mobile network nodes and their correspondent network nodes as the former move from one network location to another. In contrast, the transparent router solution of the present invention preserves all network, transport and application layer sessions as clients move from one point-to-point link to another.

Transparent Support for Standard Services

FIG. 11 illustrates that the present invention can be used for providing transparent routing of a variety of service between an internal network object and an external network object. As shown in FIG. 11, all DNS, HTTP and SMTP sessions originating from a client and destined for a host on the upstream side of the transparent routing hierarchy are deliberately routed incorrectly to one or more local servers. The local servers may reside within the transparent routing hierarchy, or may be situated upstream, and function as proxies between the upstream and downstream communicating parties.

The transparent Domain Name System (DNS) proxy may be a standard DNS forwarder, or may contain enhancements not found in a standard DNS forwarder. The transparent mail proxy may be a standard Simple Mail Transfer Protocol (SMTP) server. The transparent web proxy may be a standard Hypertext Transfer Protocol (HTTP) proxy server.

Together with the abovementioned deliberate incorrect routing, the local servers provide the illusion that their clients are connected to the public Internet, and allow them to complete their network transactions successfully, while actually performing these network transactions with the public Internet on their behalf.

Transparent proxies for other standard network application protocols can also be created in order to support the full range of protocols that are in common use on the Internet, for example, RTSP (Real Time Streaming Protocol), VoIP (Voice over Internet Protocol), etc.

Proxy servers are known. However, they conventionally require configuration of the client computer. In the present invention, the intention according to preferred arrangements is to provide additional services without modification to the client software (and therefore without the knowledge of the client software, but not necessarily without the knowledge of the end user that is using the client).

Phantom DHCP Server

Dynamic Host Configuration Protocol (DHCP) requires a DHCP server on its network to provide network configuration parameters.

In order to avoid network layer identifier collision between the DHCP server and clients that have been previously configured to use a fixed network layer identifier, the DHCP server may operate through one or more network interfaces that use network layer identifiers from a subset of the local loopback subnet. To ensure proper operation of the DHCP client, DHCP messages passed from server to client, prior to reaching the client, may not necessarily contain any information about the actual network layer identifier of the DHCP server, not even in the network layer protocol header. However, the DHCP server will respond to DHCP messages destined for whatever network layer identifier the client was informed that the server used in the DHCP messages.

DHCP is a protocol that has been standardised by the Internet Architecture Board (see RFC2131, RFC2132) and was developed by the Dynamic Host Configuration Working Group (DHC WG) of the Internet Engineering Task Force (IETF) headed by Professor Ralph Droms of Bucknell University. It obsoletes the older BOOTP protocol (RFC1541).

Figure 12:
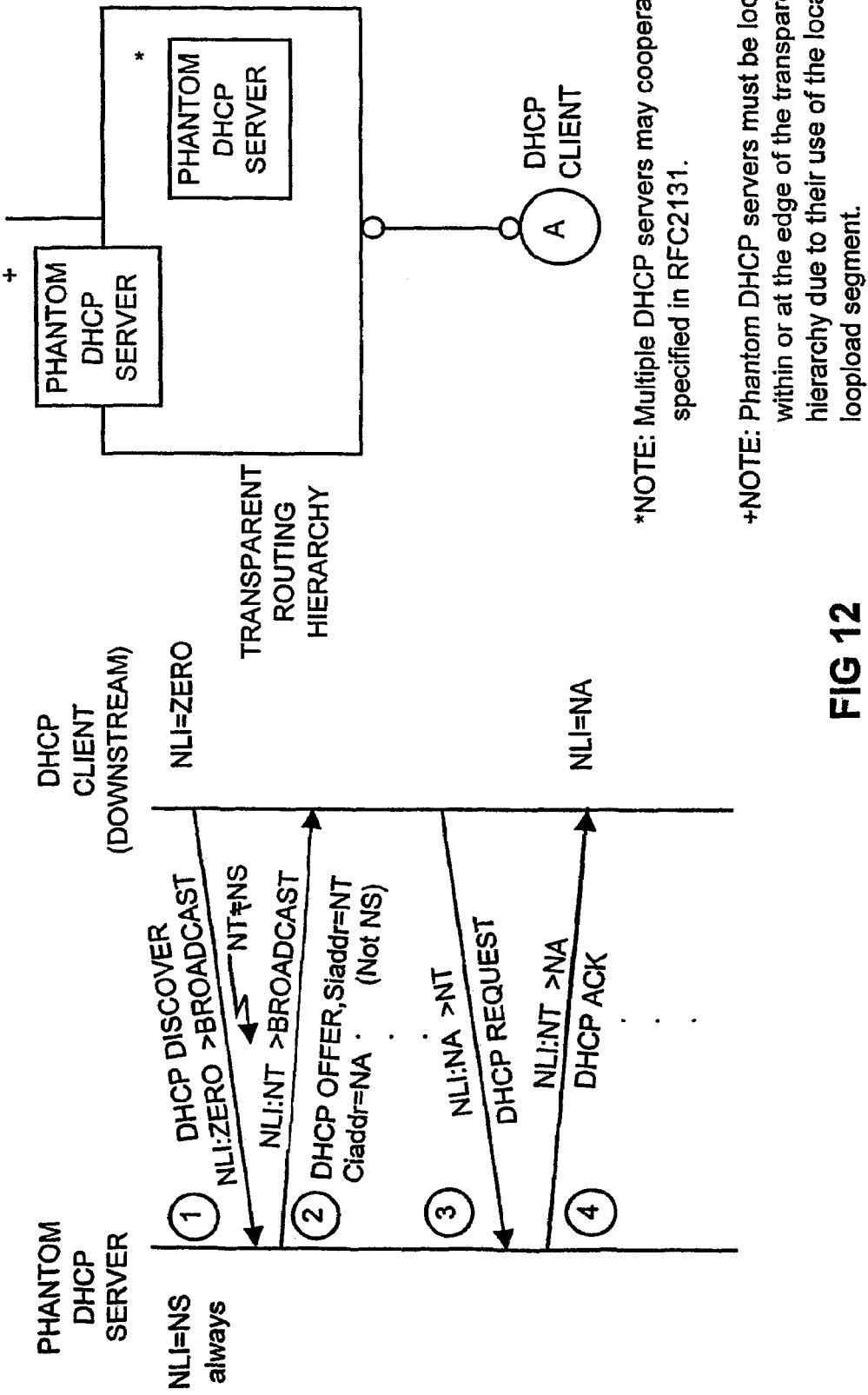
FIG. 12 illustrates the use of Dynamic Host Configuration Protocol in the context of an embodiment of the invention.

FIG. 12 illustrates a manner in which the present invention can be applied to the use of DHCP. The use of false information in the compulsory "server identifier" option of DHCP messages is expressly prohibited by RFC2131, but can be used to implement the present invention.

Initially, the DHCP client does not have an associated NLI (e.g. in the case of IPv4, this would be the IP address 0.0.0.0). The DHCP server has an NLI of NS. The steps shown in FIG. 12 are as follows:

(1) A DHCP client broadcasts a DHCP DISCOVER message.

(2) Phantom DHCP server replies with a DHCP OFFER message offering the client, among other settings, the NLI NA. However, the server crafts the reply such that it appears to originate from a DHCP server whose NLI is NT, even in the network layer PDU. In addition, none of the fields in the DHCP messages from the server (e.g. siaddr) reflect its true NLI NS (e.g. in this case, it reflects NT instead). It is useful to generate NT such that it is on the same network layer subnet as the client would be on if the latter accepted the host configuration settings from the DHCP server.

(3) The client decides to accept the settings from the DHCP server and transmits an appropriate DHCP REQUEST message to the server whose NLI is NT. Note that such a server does not actually exist; the phantom DHCP server makes it appear to the client that such a server does exist, and is offering configuration settings to the client as if it was such a server.

(4) The phantom DHCP server replies with a DHCP ACK message confirming the host configuration settings of the client. Again, the true network layer identifier of the phantom DHCP server, NS, is hidden from the client at all protocol levels.

Multiple phantom DHCP servers may cooperate to serve overlapping groups of clients, as described for normal DHCP servers in RFC 2131.

Support for Misconfigured Clients

FIG. 13 illustrates the use of periodic router advertisements to provide support for misconfigured clients. If a client is preconfigured to use an incorrect network layer identifier that was not assigned by DHCP or some other dynamic configuration mechanism, and in addition, does not have a default gateway, then conventionally, it will not be able to obtain Internet access until these client settings are modified.

This problem is circumvented by the periodic downstream transmission of routing advertisements by the transparent routing hierarchy. The advertised routes need not be valid. These routing advertisements are used purely to cause the downstream network nodes to automatically configure a default router.

The routing advertisements alone do not cause such misconfigured clients to be able to obtain Internet access. In combination with the rest of the system described herein, however, such clients are able to obtain Internet access.

In addition to not having a default gateway, misconfigured clients may also lack a default DNS server. Where such clients support the NetBIOS protocol (RFC1001, RFC1002) and subsequent generations of the NetBIOS protocol (NetBEUI, NT LAN Manager, etc), it is well-known that they may subsequently fall back to NetBIOS name lookups.

To provide DNS support for such clients, a NetBIOS/NetBEUI nameserver is set up as a transparent DNS proxy.

A Windows NT LAN Manager Transparent Proxy is less of a transparent proxy than an illegal server. It makes NT domain logons and NT PDC authentication always succeed, in order to cause clients to never display an error message (e.g. the network is unreachable, unable to log in, invalid password, etc) to the end users of client nodes.

In addition, anonymous file shares are provided, and access control is determined simply by the LLI of the client node, although additional access control mechanisms (e.g. a simple username/password pair) is possible in future. In addition, since clients' LLI are typically globally unique, it is possible to provide persistent roaming shares to users of different transparent routing hierarchy installations through conventional file sharing mechanisms.

Transparent Private Network Support

A "Creative DNS Forwarder" may be used in conjunction with the invention in order to overcome problems in implementing the invention in some configurations. Downstream network nodes may be configured to depend for proper operation on servers whose names are known only within a private network which is not accessible via the public Internet. Where such networks are not accessible directly or indirectly from the external interfaces of the transparent routing hierarchy itself, these clients may not be able to function without error.

To enable such clients to function without error, a creative DNS forwarder is used in place of a standard DNS forwarder in the abovementioned transparent DNS.

The creative DNS forwarder is similar to a standard DNS forwarder with one exception: it analyzes requests from a client resolver as well as replies from one or more upstream servers in the DNS hierarchy in order to decide when to depart from the DNS standard when replying to a client.

In particular, heuristics are used to decide whether or not to create false information in order to provide the illusion that DNS queries from downstream network nodes succeed. This process is initiated whenever necessary.

As an example of possible heuristics, if an NXDOMAIN or other error indication is received from an upstream DNS server in reply to a forwarded query from a downstream client, or if no reply is forthcoming from upstream DNS servers within a specified timeout, then a reply is generated dynamically and returned to the client in order to force the client's DNS lookup to succeed. The heuristics used need to be tuned to suit the actual network environment in which the creative DNS forwarder is deployed.

In addition, whenever a client attempts to initiate a communications session with the network node whose network layer identifier was returned in a falsified DNS reply above, the session is either handled as above (see Transparent Support for Standard Services), or if no transparent proxy is available, then it is explicitly rejected by an appropriate firewalling mechanism operating either within the transparent routing hierarchy or upstream from it.

Figure 14:
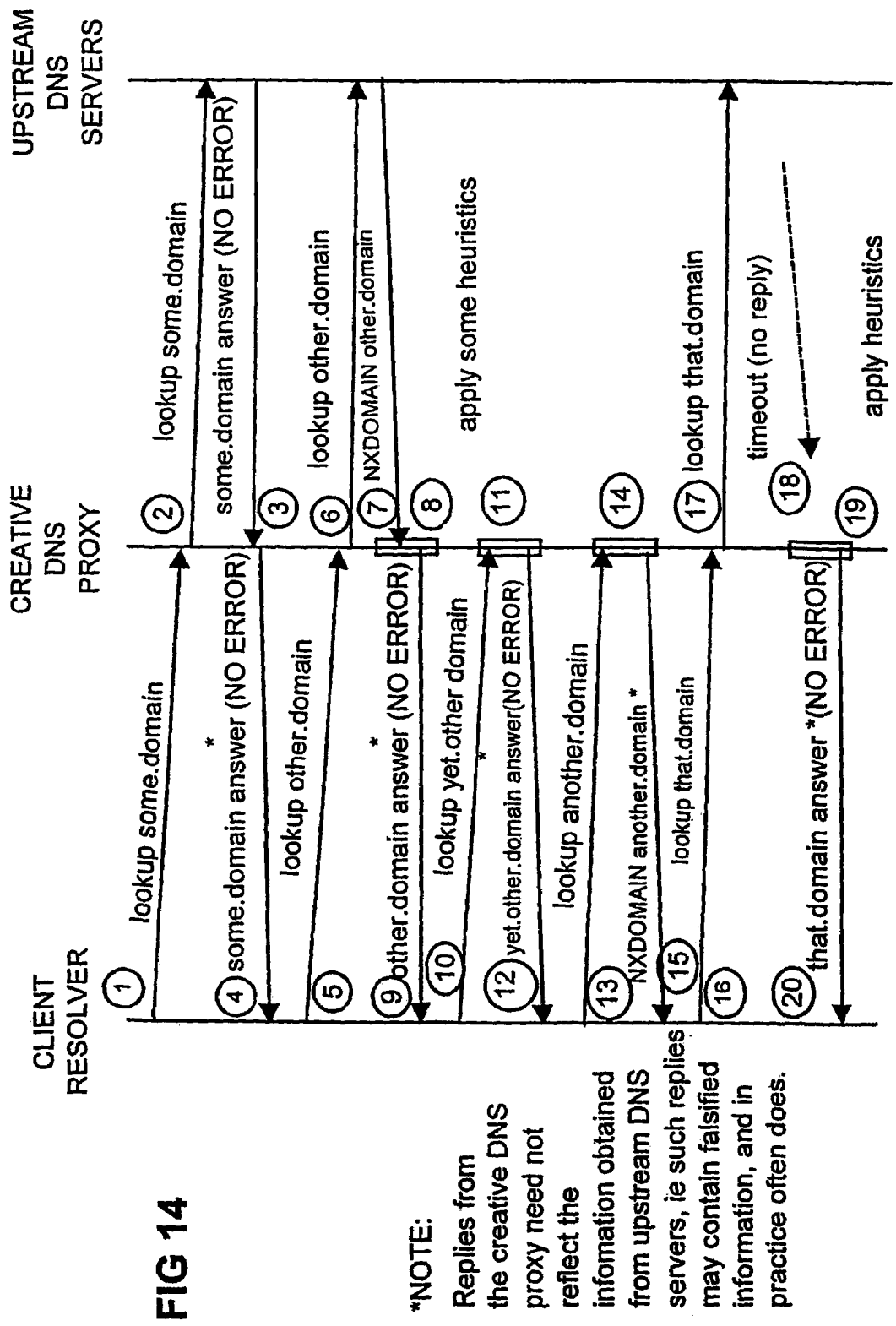
FIG. 14 shows the use of a "creative" Domain Name System forwarder in accordance with a preferred feature of the invention.

FIG. 14 illustrates a Creative DNS Proxy with the following steps:

(1) An internal networked object (client node) transmits a DNS lookup message.

(2) The creative DNS proxy intercepts the client's lookup message and transmits a forwarded lookup to a DNS server located upstream.

(3) The upstream DNS server successfully resolves the query and responds with the result (NOERROR).

(4) The creative DNS proxy returns the response to the client, making changes to the data where appropriate.

(5) The client transmits a DNS lookup message.

(6) The creative DNS proxy intercepts the client's lookup message and transmits a forwarded lookup to a DNS server located upstream.

(7) The upstream DNS server replies with a non-existent domain (NXERROR) message.

(8) The creative DNS proxy determines, via the internal application of heuristics, that a successful reply should be returned to the client.

(9) The creative DNS proxy dynamically generates appropriate information for a successful reply (NOERROR) and forwards the constructed reply to the client.

(10) The client transmits a DNS lookup message.

(11) The creative DNS proxy intercepts the client's lookup message. Through the internal application of heuristics, it determines that no lookup to upstream servers is necessary.

(12) The creative DNS proxy constructs an appropriate DNS response and forwards it to the client. Such a response may or may not contain dynamically generated information as in step (9) above.

(13) The client transmits a DNS lookup message.

(14) The creative DNS proxy intercepts the client's lookup message. Through the internal application of heuristics, it determines that a non-existent domain (NXDOMAIN) message should be returned to the client.

(15) The creative DNS proxy generates an NXDOMAIN response and forwards it to the client.

(16) The client transmits a DNS lookup message.

(17) The creative DNS proxy intercepts the client's lookup message and transmits a forwarded lookup to a DNS server located upstream.

(18) After a specified timeout, the creative DNS proxy still has not received a reply from the upstream DNS server and assumes that a reply will not be forthcoming. Note that the creative DNS proxy may query multiple upstream DNS servers in series or in parallel, and may retransmit DNS requests to upstream servers until some finite number of timeouts have occurred before concluding this.

(19) Through the internal application of heuristics, the creative DNS proxy determines that either a non-existent domain message (as in step 15 above), or a successful DNS response (as in step 9 above) should be returned to the client.

(20) The creative DNS proxy constructs an appropriate response as determined in step 19 and forwards it to the client.

Transparent Support for Non-Standard Services

It will be appreciated that the present invention can be used to provide transparent support for non-standard devices such as drag and drop printers, faxes, etc. This can be implemented by way of an application server provider for output devices The invention can also be adapted to provide network access to output devices which lack driver support for networked nodes; e.g.: network computer e.g. palmtop, or embedded appliance e.g. scanner, web/browser based access to network server e.g. web server on print/fax server, or embedded in printer/fax machine.

One problem with this is that it is necessary to install a device driver for any output device to convert application native format to output device native format. Changing the output device or using new features on output device requires installation of new drivers. This problem can be solved by an intelligent network accessible converter that translates any application format to any device format accessible to the former. This has the benefit that there is no driver installation problem. For roaming users, there is no need to install drivers for new devices in a visited network. For large scale deployment, there is no need to install drivers for all network nodes to use new shared devices. All users have access to all available shared devices immediately.

Further, this can provide a single point of maintenance and upgrade. Driver support is only required at the server end. Access control and usage accounting can be controlled at the server end.

An example application of this is a common shared file repository or web url to access output device. For exported file directories, a well-known workgroup (trademarked) e.g. ASP printer, ASP fax, is advertised by the local browse master. The user uses the file→save as option, select network→ASP workgroup to print/fax the file. To specify a fax number, the ASP fax workgroup has a predefined list of fax recipient directories e.g. ANT Labs company fax file directory. To specify a new fax number, the user saves the document in the Other fax recipients directory and document filename is the fax number.

For web based access, a pull down menu shows all the available output device on the network, similar to the pull down menu selection of printers on MS Windows. After selecting a specified output device, the web page is updated to allow selection of the output device capabilities e.g. color/b&w, A3/A4, duplex, fax number, etc. The user can chose to preview the printout, which converts the document to HTML or XML. The user submits the document for printing/fax via HTTP POST MIME ENC/DATA type to a common file repository.

An intelligent converter can identify the document type using the default file extension or parsing the document file header. A dumb converter can depend on the user to select the appropriate document filter and force the user to save-as a support document format e.g. postscript, HTML. The dumb converter can be used as a failsafe catch-all solution when the intelligent converter fails.

Movement Detection

A glue protocol can be used between the link and network layers (e.g. the Address Resolution Protocol (ARP) in the case of TCP/IP over Ethernet) for the purpose of presence detection. Presence detection can be used in this way for usage monitoring purposes.

When an ARP request is detected from a client, the originating network node's link layer and network layer identifiers are remembered, together with a timestamp indicating the time of detection. Within a specified interval, an ARP request is transmitted by the transparent router to solicit a reply from the client. Such an ARP request should be unicast to the network node in question. If no reply is forthcoming within a specified timeout, the client is deemed to be no longer a member of the network and that client's resource usage records may be updated accordingly.

ARP requests may be transmitted along the same point-to-point link from which the client's first ARP request was received by the transparent router. Alternatively, if movement detection is desired, this ARP request may be transmitted across all (or a set of adjacent) downstream point-to-point links by the transparent router, even if the ARP request is itself not destined for a broadcast link layer identifier.

Any protocol that serves a similar bridging function between link and network layer protocols (e.g. ARP) may be used for presence detection, billing, and movement detection in this manner.

Not all ARP requests are replied to by the transparent router. Instead, only those ARP requests originating from the link layer identifiers of network nodes which are known to reside at the remote end of a downstream point-to-point link from the router, and which are not destined for the network layer identifier of a network node also known to be at the remote end of the same network link, will solicit replies from the transparent router, and only after a specified timeout.

For example, if there is more than one node at the same end of a point-to-point link, and one of them is transmitting an ARP request for another, then the transparent router will not reply. And if one node ARPs for another node whose presence or absence at that end of the point-to-point link is unknown, then a deliberate delay is introduced before the transparent router transmits an ARP reply.

An important consequence of this is that a broadcast link layer supporting multiple network nodes may exist at the remote end of a given point-to-point link from the transparent router with minimal interference from the transparent router itself, i.e. ARP still works between nodes on the shared link layer without any active interference by the transparent router, while any attempt on the part of those network nodes to communicate with a network node not on the same link layer would result in interaction with the transparent router across the point-to-point link, as described in Transparent Router above.

In addition, network nodes that migrate from one point-to-point link to another have their movement patterns detected by the transparent router, which may update its configuration in order to continue routing network traffic to and from such nodes without causing existing network or application level sessions residing on those nodes to be interrupted permanently, regardless of whether such sessions are stateful or stateless.

This applies regardless of whether the transparent router in this section refers to a single transparent router, or a collection of transparent routers operating in tandem (see Transparent Routing Hierarchy above).

It is to be understood that various alterations, additions and/or modifications may be made to the parts previously described without departing from the ambit of the present invention.

What is claimed is:

1. A method of configuring a computer network, which includes a configurable router and a plurality of networked objects, each of the networked objects located at a network node in the network, the method including the steps of:
    (a) providing a point-to-point link between the configurable router and each network node;
    (b) assigning a point-to-point link identifier to each of the point-to-point links;
    (c) obtaining for the each of the networked objects a link layer identifier;
    (d) receiving at the configurable router a previous communication from at least one of the networked objects, a source of the previous communication is determinable by reference to a previous identifier pair consisting of a previous point-to-point link identifier and a previous link layer identifier associated with the previous communication;
    (e) receiving at the configurable router a current communication, wherein when the current communication is received from the at least one of the networked objects, a source of the current communication is determined by reference to a current identifier pair consisting of a current point-to-point link identifier and a current link layer identifier, and when the current communication is intended for the at least one of the networked objects, a destination of the current communication is determinable by reference to the current identifier pair consisting of the current point-to-point link identifier and the current link layer identifier obtained by translating a network address associated with the current communication; and
    (f) detecting movement of the at least one of the networked objects from one point-to-point link to another by detecting at the configurable router discrepancies between the current identifier pair associated with the current communication and the previous identifier pair associated with the previous communication, wherein a physical location of the at least one of the networked objects is tracked in the event of the movement of the at least one of the networked objects from one point-to-point link to another based on the previous point-to-point link identifier and the current point-to-point link identifier; and (g) automatically resolving addressing of the current communication in accordance with the detected movement.

2. The method of configuring a computer network according to claim 1, including the further steps of:

detecting addition of the at least one of the networked objects when the current identifier pair does not match any identifier pair in a routing table of the configurable router, or detecting deletion of the at least one of the networked objects by detecting a time-out of an address resolution protocol message sent to the at least one of the networked objects; and automatically resolving addressing of the current communication in accordance with the detected addition or deletion.

3. The method of configuring a computer network according to claim 1 or claim 2, wherein the configurable router consists of a plurality of networked routers which operate together.

4. The method of configuring a computer network according to claim 3, wherein the each of the networked objects also is assigned network layer identifier which is non-unique within the computer network, wherein communications to the each of the networked objects within the computer network are routed using point-to-point link identifiers, but communications to objects external to the computer network are routed from the configurable router to the external objects using the network layer identifiers.

5. The method of configuring the computer network according to claim 4, wherein routing of messages to and from the configurable router is accomplished by use of a routing table which includes, for each link layer identifier, a corresponding network layer identifier, a corresponding point-to-point link identifier and a corresponding network interface, wherein the network interface indicates a location associated with the router through which communications are made to a networked object associated with each link layer identifier.

6. The method of configuring a computer network according to claim 5, including the further steps of:

(a) intercepting Domain Name System (DNS) requests from the networked objects;

(b) analyzing the DNS requests; and (c) where appropriate, creating information indicative of successful Domain Name System requests and forwarding that information to the requesting networked objects.

7. The method of configuring the computer network according to claim 4, including the further steps of:

(a) intercepting Domain Name System (DNS) requests from the networked objects;

(b) analyzing the DNS requests; and (c) where appropriate, creating information indicative of successful Domain Name System requests and forwarding the information to the requesting networked objects.

8. The method of configuring a computer network according to claim 1 or 2, wherein the each of the networked objects is also assigned a network layer identifier which is non-unique within the computer network, wherein communications to networked objects within the computer network are routed using point-to-point link identifiers, but communications to objects external to the computer network are routed from the configurable router to the external objects using the network layer identifiers.

9. The method of configuring the computer network according to claim 8, wherein routing of messages to and from the configurable router is accomplished by use of the routing table which includes, for each link layer identifier, a corresponding network layer identifier, a corresponding point-to-point link identifier and a corresponding network interface, wherein the network interface indicates a location associated with the configurable router through which communications are made to a networked object associated with each link layer identifier.

10. The method of configuring the computer network according to claim 8, the further steps of:

(a) intercepting Domain Name System (DNS) requests from the networked objects;

(b) analyzing the DNS requests; and (c) where appropriate, creating information indicative of successful Domain Name System requests and forwarding the information to the requesting networked objects.

11. The method of configuring a computer network according to claim 1 or 2, comprising the further steps of:

(a) intercepting Domain Name System (DNS) requests from the networked objects;

(b) analyzing the DNS requests; and (c) where appropriate, creating information indicative of successful Domain Name System requests and forwarding that the information to the requesting networked objects.

12. A method of network address translation for communications between an internal computer network and an external network, and allowing movement of each of the internal network objects within the internal network which has a configurable router, the method including the following steps:

(a) providing a logical point-to-point link between the configurable router and each of the internal network objects;

(b) assigning a point-to-point link identifier to each of the point-to-point links;

(c) obtaining for the each of the internal network objects a link layer identifier;

(d) receiving at the configurable router a previous communications from at least one of the internal network objects addressed to an external network object in the external network, an address of the external network object being determinable by means of a network layer identifier associated with the external network object, an internal network source of the previous communication being determinable by reference to a previous identifier pair consisting of a previous point-to-point link identifier and a previous link layer identifier associated with the previous communication;

(e) forwarding the previous communication to the external network object;

(f) receiving at the configurable router a current communication, wherein when the current communication is received from the at least one of the internal network objects, a source of the current communication is determined by reference to a current identifier pair consisting of a current point-to-point link identifier and a current link layer identifier, and when the current communication is received from one of the external network objects in the external network intended for the at least one of the internal networked objects, a destination of the current communication is determined by the current identifier pair consisting of the current point-to-point link identifier and the current link layer identifier obtained by translating a network address associated with the current communication, and forwarding the current communication to the determined destination; and (g) detecting movement of the at least one of the internal network objects from one point-to-point link to another by detecting at the configurable router discrepancies between the current identifier pair associated with the current communication and the previous identifier pair associated with the previous communication, wherein a physical location of the at least one of the networked objects is tracked in the event of the movement of the at least one of the networked objects from one point-to-point link to another based on the previous point-to-point link identifier and the current point-to-point link identifier; and (h) automatically resolving addressing of the current communication in accordance with the detected movement.

13. The method of network address translation according to claim 12, wherein the network layer identifier is assigned to the previous communication forwarded from the configurable router to the external network object, the assigned network layer identifier being the network layer identifier or one of a group of network layer identifiers associated with the configurable router.

14. The method of network address translation according to claim 12 or 13, including the further steps of detecting addition of the at least one of the internal network objects when the current identifier pair does not match any identifier pair in a routing table of the configurable router, or detecting deletion of the at least one of the internal network objects by detecting a time-out of an address resolution protocol message sent to the at least one of the networked objects; and automatically resolving addressing of the current communication in accordance with the detected addition or deletion.

15. The method of network address translation according to claim 14, including the further step of providing transparent routing services for one or more of:
(a) Domain Name System services;
(b) electronic mail services;
(c) Hypertext Transfer Protocol services;
(d) audio services;
(e) video services;
(f) telephone services.

16. The method of network address translation according to claim 12 or 13, including the further step of providing transparent routing services for one or more of:
(a) Domain Name System services;
(b) electronic mail services;
(c) Hypertext Transfer Protocol services;
(d) audio services;
(e) video services;
(f) telephone services.

17. A method of configuring a computer network, which includes two or more transparent routers and a plurality of networked objects, each of the networked objects located at a network node in the network and having a network layer identifier, the method including the steps of:
(a) providing a point-to-point link between one of the transparent routers and each network node;
(b) assigning a point-to-point link identifier to each of the point-to-point links;
(c) obtaining for the each of the networked objects a link layer identifier;
(d) receiving at one of the transparent routers a previous communication from at least one of the networked objects, a source of the previous communication is determinable by reference to a previous identifier pair consisting of a previous point-to-point link identifier and a previous link layer identifier associated with the previous communication;
(e) receiving at one of the transparent routers a current communication, wherein when the current communication is received from the at least one of the networked objects, a source of the current communication is determined by reference to a current identifier pair consisting of a current point-to-point link identifier and a current link layer identifier, and when the current communication is intended for the at least one of the networked objects, a destination of the current communication is determinable by reference to the current identifier pair consisting of the current point-to-point link identifier and the current link layer identifier obtained by translating a network address associated with the current communication; and
(f) detecting movement of the at least one of the networked objects from one point-to-point link to another by detecting at the one of the transparent routers discrepancies between the current identifier pair associated with the current communication and the previous identifier pair associated with the previous communication, wherein a physical location of the at least one of the networked objects is tracked in the event of the movement of the at least one of the networked objects from one point-to-point link to another based on the previous point-to-point link identifier and the current point-to-point link identifier; and
(g) automatically resolving addressing of the current communication in accordance with the detected movement;
wherein the two or more transparent routers are connected to form a routing hierarchy, and each of the two or more transparent routers is allocated a network layer identifier from a local loopback segment of network layer identifiers, thereby avoiding collisions with any valid network layer identifier currently in use by a network node.

18. A method of configuring a wireless computer network to allow movement of networked objects within the network, which includes a transparent router and a plurality of networked objects, each of the networked objects located at a network node in the wireless computer network, the method-including the steps of:
(a) providing a point-to-point link between the transparent router and each network node;
(b) assigning a point-to-point link identifier to each of the point-to-point links;
(c) obtaining for the each of the networked objects a link layer identifier;
(d) receiving at the transparent router a previous communication from at least one of the networked objects, a source of the previous communication is determinable by reference to a previous identifier pair consisting of a previous point-to-point link identifier and a previous link layer identifier associated with the previous communication;

(e) receiving at the transparent router a current communication, wherein when the current communication is received from the at least one of the networked objects, a source of the current communication is determined by reference to a current identifier pair consisting of a current point-to-point link identifier and a current link layer identifier, and when the current communication is intended for the at least one of the networked objects, a destination of the current communication being determinable by reference to the current identifier pair consisting of the current point-to-point link identifier and the current link layer identifier obtained by translating a network address associated with the current communication; and (f) detecting movement of the at least one of the networked objects from one point-to-point link to another by detecting at the transparent router discrepancies between the current identifier pair associated with the current communication and the previous identifier pair associated with the previous communication, wherein a physical location of the at least one of the networked objects is tracked in the event of the movement of the at least one of the networked objects from one point-to-point link to another based on the previous point-to-point link identifier and the current point-to-point link identifier; and (g) automatically resolving addressing of current communication in accordance with the detected movement.

19. The method of configuring a wireless computer network according to claim 18, including the further steps of:

detecting addition of the at least one of the networked objects when the current identifier pair does not match any identifier pair in a routing table of the configurable router, or detecting deletion of the at least one of the networked objects by detecting a time-out of an address resolution protocol message sent to the at least one of the networked objects; and automatically resolving addressing of the current communication in accordance with the detected addition or deletion.

20. The method of configuring a wireless computer network according to claim 18 or claim 19, wherein the transparent router consists of a hierarchy of routers wherein each router in the hierarchy is allocated a network layer identifier from a local loopback segment of network layer identifiers, thereby avoiding collisions with any valid network layer identifier currently in use by a network node; wherein further each router which connects directly to the at least one of the network objects is the transparent router.

* * * * *